H. J. Denham
INVENTOR

By: Marks & Clark
Att'ys.

Patented May 6, 1930

1,757,007

UNITED STATES PATENT OFFICE

HUMPHREY JOHN DENHAM, OF MANCHESTER, ENGLAND, ASSIGNOR TO HENRY SIMON LIMITED, OF MANCHESTER, ENGLAND, A BRITISH COMPANY

MACHINE FOR PURIFYING CEREAL PRODUCTS OR REMOVING BRANNY MATERIAL THEREFROM

Application filed January 21, 1927, Serial No. 162,640, and in Great Britain February 1, 1926.

Machines for purifying grain or cereal products or for removing the branny particles of high ash content having large surface and low weight, from the relatively dense particles of, for example, semolina of low ash content having small surface and high weight, usually comprise a number of successive compartments. Each of such compartments has a silk base or screen over which the material is passed and through which a flow of air is induced by suitable means so that the lightest material is withdrawn by the draught, the heaviest material descends through the screen and the medium material remains on the screen and travels through the machine from compartment to compartment until it passes down a shoot or conduit up which a stream of air is drawn for the purpose of making a final separation of the light particles from the grain.

The object of my present invention is to provide an improved machine in which the separation of the branny material is so effectively accomplished in its transit therethrough that the desired purification is obtained without the employment of a tail or final aspirating shoot with its attendant and well known disadvantages resulting from the action of the air moving in a reverse direction to that of the descending cereal products.

My invention comprises the improved combination and arrangement of parts hereinafter described and claimed.

Referring to the accompanying sheet of explanatory drawings:—

Figure 3 is a detail view to be hereinafter referred to.

Figure 4 is a view similar to Figure 1 but showing a modified arrangement of machine.

Figure 6 is a view showing adjustment means hereinafter referred to.

The same reference letters in the different views indicate the same or similar parts.

Figure 1:
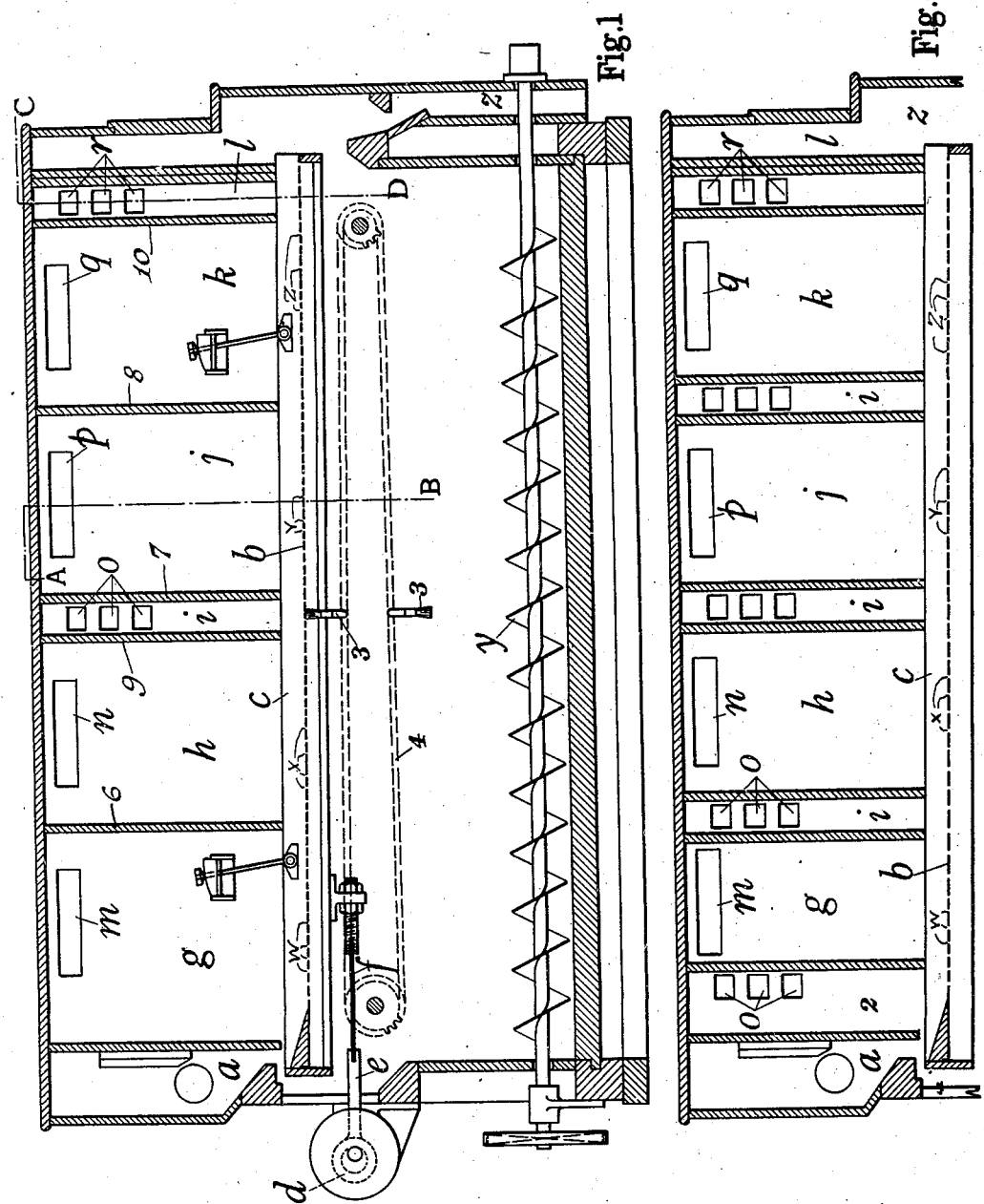
Figure 1 is a sectional elevation and Figure 2 a cross sectional view of a grain purifying machine constructed in one convenient form in accordance with my invention. The left hand portion of Figure 2 is taken on the line A B Figure 1, and the right hand portion on the line C D Figure 1.
Figure 2:
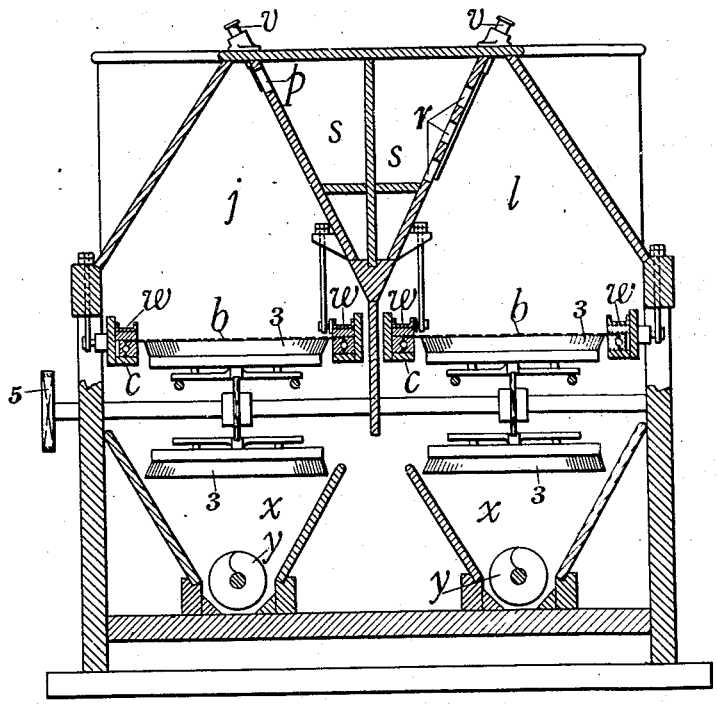
Figure 3:
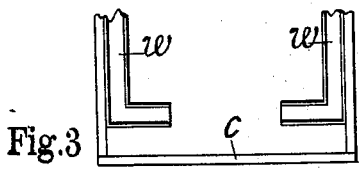

Referring to Figures 1-3 of the drawings, the grain or cereal product is fed into the machine at $a$ and travels over a sieve or screen $b$ consisting of successive lengths of silk which are of different mesh as in usual practice. The divisions of the sieve according to its mesh are indicated at W, X, Y and Z in Figures 1 and 4. The said silk sieve or screen $b$ is mounted in or forms the base of the suspended frame $c$ to which a vibrating or reciprocating movement is imparted in any well known manner, as for example, by the eccentric $d$, and connecting rod $e$ consisting in part of a spring $f$. Such vibrating or reciprocating movement of the screen which is in the direction indicated by the double arrow V Figure 1 causes the grain or cereal product to travel along it.

Figure 6:
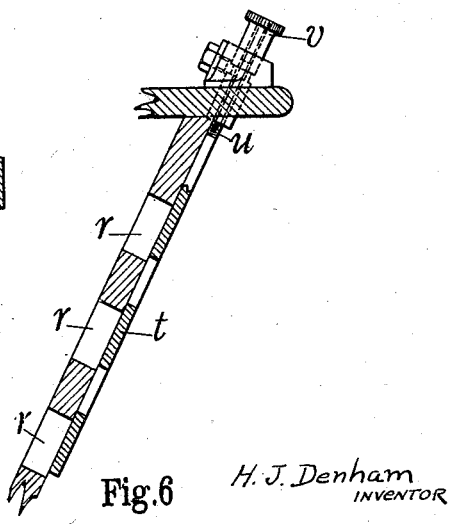

The space above the screen is divided into as many compartments as there are different meshes of sieve by division walls 6, 7 and 8; but additional walls 9 and 10 divide two of said compartments into relatively large and small divisions. The undivided compartments $g, j$ and the divisions $h, i$ and $k, l$ of the remaining compartments have each an independent aspiration applied thereto through the apertures $m, p, n, o, q$ and $r$. In the compartments or divisions $g, h, j, k$, the air or aspirating current is weaker than in the divisions $i, l$ and whilst such weaker current allows the medium material to remain on the silk or screen $b$, it allows the heavy material to fall therethrough. The divisions $i$ and $l$ which are relatively small have a relatively strong aspiration applied thereto for carrying off the light particles of branny material and delivering the latter into the passage way $s$ from which it is delivered at one end of the machine in the known manner. The aspiration or air exhaustion is applied to all the compartments and divisions through the conduit or passage $s$ but by controlling the sizes of the apertures $m, n, o, p, q, r$ I can obtain the desired aspiration effects in the separate compartments or divisions. Such control or adjustment may be obtained by means of a grid or perforated plate as $t$ operated by a screw $u$ fitted with nut $v$ as shown in the detail view at Figure 6.

The machine illustrated has two similar series of compartments and divisions as aforesaid arranged side by side as shown at Figure 2.

With a particular mesh of silk or screen beneath, for example, the compartments $h$ and $i$, the thickness of the grain or products upon the silk will be the least in the compartment $i$ where the strong aspirating action removes the lighter particles of branny material.

Along the sides of the compartments I provide trays or troughs $w$ into which falls any dusty material or offal which tends to adhere to and accumulate upon the compartment walls. The ends of the troughs project inwards as shown in Figure 3 (which is a plan view of the delivery ends of the troughs) into the compartment 1 so that the material from the troughs is subjected to the strong aspiration in such compartment. The said troughs are attached to or form part of the aforesaid suspended frame $c$ of the screen $b$.

The material which passes through the silk or screen $b$ falls into a trough as $x$ beneath it and is delivered from one end of the machine by a worm conveyor as $y$. The material remaining upon the silk or screen passes down the delivery shoot $z$.

In the arrangement shown in Figure 4, each of the compartments is divided into small and large divisions or sections. The cereal product is also subjected to an initial high aspiration at 2 to reduce the quantity of light branny material and dust passing through the compartments.

With my machines, the cereal product delivered from the last compartment as 1 is free from lighter particles of bran so that a final aspiration as the material descends the delivery shoot $z$ is unnecessary.

By applying a strong aspiration to the material at successive stages in its passage through the machine and whilst it is still upon the silk, I accomplish the desired purification thereof without the complications necessitated by the usual tail aspiration in which the air has to act upon particles moving in a reverse direction to itself.

The silk or screen $b$ is kept in a clean and effective condition by means of brushes as 3 carried by the endless chain 4 and so that they make contact with and brush the underside of the silk as illustrated at Figures 1 and 2. The chain is kept in motion through the gear wheel 5 (Figure 2) or in any other well known manner.

Figure 5:
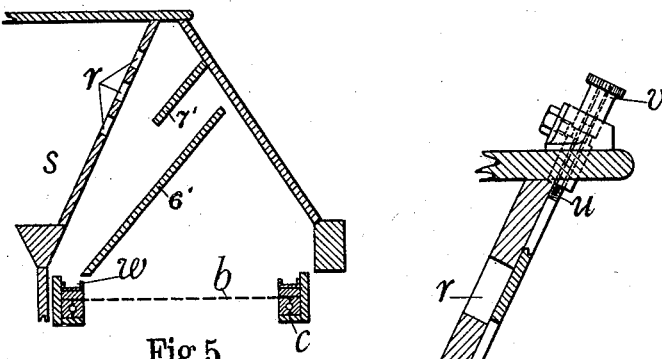
Figure 5 is a cross sectional view of a further modified arrangement.

Should it be found that in dealing with any particular cereal products, there is a tendency for too much of the latter to be carried over by the air current in the compartments of strong aspiration, I may provide means for baffling and diverting such air current so as to cause it to deposit the heavier material carried thereby. One convenient arrangement of baffles for the compartments of strong or high aspiration is shown in Figure 5 where the air passes over the baffle 6' and under the baffle 7' before passing through the ports $r$. Any material deposited by the air due to the said baffles will be received by one of the side trays $w$ aforesaid.

What I claim is:—

In machines for purifying cereal products by aspiration, in combination, a continuous longitudinally reciprocatory sieve comprising a plurality of sections of different mesh, a casing enclosing a space above said sieve, a longitudinal series of transverse divisions dividing said casing into as many compartments as there are different mesh sections of sieve, a division wall across some of said compartments transverse to the direction of reciprocation dividing said compartments into relatively large and small divisions, and independent valves upon each compartment and each division of a compartment controlling the aspirating action in each compartment to give a strong aspiration in the small divisions and a less strong aspiration in the large divisions and compartments, whereby tail aspiration at the end of the sieve is obviated and the efficiency of separation increased.

In testimony whereof I have signed my name to this specification.

HUMPHREY JOHN DENHAM.